US009445146B2

(12) United States Patent
Maier

(10) Patent No.: US 9,445,146 B2
(45) Date of Patent: Sep. 13, 2016

(54) MULTIMEDIA ARRANGEMENT

(71) Applicant: fm marketing gmbh, Neumarkt am Wallersee (AT)

(72) Inventor: Ferdinand Maier, Neumarkt am Wallersee (AT)

(73) Assignee: fm marketing gmbh, Neumarkt am Wallersee (AT)

( * ) Notice: Subject to any disclaimer, the term of this patent is extended or adjusted under 35 U.S.C. 154(b) by 162 days.

(21) Appl. No.: 14/527,048

(22) Filed: Oct. 29, 2014

(65) Prior Publication Data

US 2015/0058887 A1 Feb. 26, 2015

Related U.S. Application Data

(63) Continuation of application No. 12/663,029, filed as application No. PCT/EP2008/004440 on Jun. 4, 2008, now abandoned.

(30) Foreign Application Priority Data

Jun. 4, 2007 (EP) .................................... 07010957

(51) Int. Cl.
*G08C 19/12* (2006.01)
*H04N 21/422* (2011.01)
(Continued)

(52) U.S. Cl.
CPC ...... *H04N 21/42218* (2013.01); *H04N 5/4403* (2013.01); *H04N 5/44543* (2013.01);
(Continued)

(58) Field of Classification Search
CPC ........ H04N 5/00; H04N 5/44; H04N 5/4403; H04N 5/445; H04N 5/44543; H04N 21/00; H04N 21/40; H04N 21/4104; H04N 21/4126; H04N 21/47; H04N 21/482; H04N 21/4821; H04N 21/80; H04N 21/42218; H04N 21/43615; H04N 21/4532; H04N 21/4415; H04N 21/42206; H04N 21/4182; H04N 21/4751; H04N 2005/4416; H04N 2005/4444; H04N 2005/4442; H04N 2005/4428; G06F 3/01; G06F 3/048; G06F 3/0481; G06F 3/04817; G06F 3/0482; G06F 3/0484; G06F 3/04842
See application file for complete search history.

(56) References Cited

U.S. PATENT DOCUMENTS 5,659,883 A 8/1997 Walker et al.
5,758,257 A 5/1998 Herz et al.
(Continued)

FOREIGN PATENT DOCUMENTS

DE 19858310 A1 6/2000
EP 1602999 A1 12/2005
(Continued)

OTHER PUBLICATIONS

International Preliminary Report on Patentability, PCT/EP2008/004440, dated Jan. 12, 2010, 9 pages.
(Continued)

*Primary Examiner* — Ryan Sherwin
(74) *Attorney, Agent, or Firm* — Senniger Powers LLP

(57) ABSTRACT

The invention relates to a multimedia arrangement comprising a remote control having a keypad with only six control buttons. All functions of the multimedia device can be controlled via three menu levels, an object group being selectable in the first menu level, an object being selectable in the second menu level, and an action to be performed with the object being selectable in the third. Elements of the object groups, objects, and actions are displayed in fields on the display device in a vertical column and a horizontal line, the column and the line intersecting in a focus field. The elements of the fields can be moved by the control buttons in the fixed focus field, and can be activated there by a selection button. Selection and arrangement of the elements is done by a user database in the multimedia device depending on data determined by an identification device of the remote control.

17 Claims, 4 Drawing Sheets

(51) Int. Cl.

| | | |
|---|---|---|
| *H04N 5/44* | (2011.01) | |
| *H04N 5/445* | (2011.01) | |
| *H04N 21/418* | (2011.01) | |
| *H04N 21/4415* | (2011.01) | |
| *H04N 21/45* | (2011.01) | |
| *H04N 21/436* | (2011.01) | |
| *H04N 21/482* | (2011.01) | |
| *H04N 21/475* | (2011.01) | |

(52) U.S. Cl.
CPC .... *H04N21/4182* (2013.01); *H04N 21/42206* (2013.01); *H04N 21/43615* (2013.01); *H04N 21/4415* (2013.01); *H04N 21/4532* (2013.01); *H04N 21/4821* (2013.01); *H04N 21/4751* (2013.01); *H04N 2005/4416* (2013.01); *H04N 2005/4428* (2013.01); *H04N 2005/4442* (2013.01); *H04N 2005/4444* (2013.01)

(56) References Cited

U.S. PATENT DOCUMENTS

| | | | |
|---|---|---|---|
| 5,771,307 | A | 6/1998 | Lu et al. |
| 5,861,881 | A | 1/1999 | Freeman et al. |
| 5,920,642 | A | 7/1999 | Merjanian |
| 6,020,882 | A | 2/2000 | Kinghorn et al. |
| 6,130,726 | A | 10/2000 | Darbee et al. |
| 6,137,539 | A | 10/2000 | Lownes et al. |
| 6,434,171 | B1 | 8/2002 | Ishida |
| 6,628,304 | B2 | 9/2003 | Mitchell et al. |
| 6,690,391 | B1 | 2/2004 | Kim et al. |
| 6,782,275 | B2 | 8/2004 | Mountain et al. |
| 6,842,653 | B2 | 1/2005 | Weishut et al. |
| 6,850,252 | B1 | 2/2005 | Hoffberg |
| 6,914,517 | B2 | 7/2005 | Kinsella |
| 6,968,565 | B1 | 11/2005 | Slaney et al. |
| 7,039,879 | B2 | 5/2006 | Bergsten et al. |
| 7,085,566 | B1 | 8/2006 | Burchard et al. |
| 7,147,157 | B2 | 12/2006 | Proennecke |
| 7,500,174 | B2 | 3/2009 | Sangster et al. |
| 7,890,889 | B2 | 2/2011 | Artman et al. |
| 8,370,744 | B2 | 2/2013 | Parker et al. |
| 8,510,776 | B2 * | 8/2013 | Fukuda ............. H04N 7/17318 725/39 |
| 2001/0007592 | A1 | 7/2001 | Pu et al. |
| 2002/0043557 | A1 | 4/2002 | Mizoguchi et al. |
| 2002/0059588 | A1 | 5/2002 | Huber et al. |
| 2003/0028872 | A1 | 2/2003 | Milovanovic et al. |
| 2003/0195969 | A1 | 10/2003 | Neuman |
| 2003/0233667 | A1 | 12/2003 | Umipig et al. |
| 2004/0183756 | A1 | 9/2004 | Freitas et al. |
| 2005/0149870 | A1 | 7/2005 | Van Ee et al. |
| 2008/0062337 | A1 | 3/2008 | Maier |
| 2009/0287930 | A1 | 11/2009 | Nagaraja |
| 2010/0109930 | A1 | 5/2010 | Maier |
| 2010/0146278 | A1 | 6/2010 | Maier |

FOREIGN PATENT DOCUMENTS

| | | |
|---|---|---|
| WO | 0156213 A1 | 8/2001 |
| WO | 0191057 A2 | 11/2001 |
| WO | 03021915 A2 | 3/2003 |
| WO | 03043318 A1 | 5/2003 |
| WO | 2004055717 A1 | 7/2004 |
| WO | 2007022481 A2 | 2/2007 |

OTHER PUBLICATIONS

Abstract of DE19858310, Jun. 29, 2000.

* cited by examiner

Fig. 2

MULTIMEDIA ARRANGEMENT

REFERENCE TO RELATED APPLICATIONS

This application is a continuation of U.S. application Ser. No. 12/663,029, filed Dec. 4, 2009, which is a U.S. national stage application of International Patent Application No. PCT/EP2008/004440, filed Jun. 4, 2008, and claims the benefit of European application No. 07010957.4, filed Jun. 4, 2007, the entire disclosures of which are incorporated herein by reference.

FIELD OF INVENTION

The invention concerns a multimedia arrangement with a remote control, multimedia equipment, and a display device for operating multimedia home electronics.

BACKGROUND

Such a multimedia arrangement is known from the patent WO 02/17627 A2.

There, a remote control for a set-top box is described, which can be personalized for the specific user, which is done using biometric features of the user, such as, for example, a fingerprint reader, a voice recognition circuit, an iris scanner, a "sniffer", or a face-recognition device. As an alternative to automated personalization, the specific user can also be required to provide a password, a specified keying sequence, or the like. With it, a set-top box and other home entertainment equipment, such as a video recorder, CD player, DVD player, and so on, can be controlled with a single remote control in one family or household.

Personalization of a remote control in connection with a set-top box has a number of advantages:
  The set-top box can be programmed in the sense of child security, so that only selected television channels are seen and other channels are blocked;
  the set-top box can be so programmed that, also in the sense of child security, only specified television times are decontrolled, while the equipment is blocked at other times;
  the set-top box can be programmed so that for each user their television preferences are put together, particularly pre-programmed groups of TV channels, such as, for instance, sport channels, entertainment channels, educational channels, etc. For each user, the spaces reserved for individual buttons on the remote control can be changed, whereby the number of possible buttons can also be reduced;
  with interactive systems, such as interactive TV, home shopping, home banking, video-on-demand, or similar ones, the user can be identified, in which additional securities can be built into the set-top box here as well, for example overall limits for ordering goods or films, types of films (for example, suitable for those under 18), etc.

In the patent WO 02/17627 A2 describing a remote control, the user is identified once using a fingerprint reader. The remote then remains personalized to this user as long as he is logged in by pressing a specific button again or by a new operation of the fingerprint reader. If this is forgotten that another user with the full access permission of the previous user can execute these functions.

As a remedy, it can be provided that the personalization and thus most of the functions are automatically turned off when no button on the remote control has been operated for a predetermined period of time or if the set-top box or a TV is turned off. It can also be provided that each push of a button or specific function is performed only when the finger-print reader has at the same time also identified an authorized person. As a further possibility, it can also be provided that all or at least several buttons on the remote are fitted with a fingerprint reader.

The patent WO 02/084991 A1 likewise describes a remote control which can be personalized for an interactive television system. There, it is primarily a matter of assigning buttons programmed for the specific user, in order to reduce the number of buttons. Additional functions such as, for example, "Open garage door", can be implemented. For several users, a table can be stored, on which the assignment of individual buttons can be set up for predetermined user-specific functions. By pressing a specific button, a menu is called up, on which all users are shown and a specific user can be selected. No security measures are provided there to prevent someone from logging on under a user name that is not assigned to him.

The U.S. Pat. No. 5,861,881 describes an interactive computer system for multimedia operation in which a user profile can be stored. This can be done both on a local computer or a host computer of a network. This computer system can also, for example, be connected to a remote transmitter by cable. Using this compiled user profile, specified data or video content can be selected.

The U.S. Pat. No. 5,715,020 describes a remote control which can control a large number of devices. Each remote has a clearly identified code. A central control unit for several remotes is thus able to identify the individual remote and assign to it specific devices to be controlled remotely.

The patent WO 2004/055717 shows a multimedia system with a remote-control unit, which exhibits a finger-print reading unit, for the remote control of a set-top box, to which a television is connected. The set-top box is connected over a network to a remotely located server. The set-top box establishes a connec-tion to the remote server only when an authorized user has been identified on the remote by the fingerprint reader.

US patent 2003/0001907 A1 describes a method and equipment for controlling an electronic device. To navigate through a hierarchy of groups of control commands, fields are represented in a column and in a row, in which the rows and the columns intersect in a focus field. The fields of a column and the fields of a row can be moved separately. The column field and the row field found in the focus field are combined to bring about a predefined action. At the same time, a variable number on the menu level is provided whereby, if need be, the elements placed in the focus field call up the next menu level. The user thereby still retains an overview, and additional information is displayed in fields adjacent to the focus field on the respective menu level.

Similar devices are also described in EP 1 185 922 B1, EP 1 291 754 A2, and EP 1 425 652 A1. Many hierarchies and menu levels are also provided there, in case any of them are needed, which complicates operation and makes it confusing.

US 2002/0043557 A1 describes a multimedia system with a remote control which identifies a special memory card related to the equipment to be controlled.

Multimedia systems with remote control and the highlighted representation of selectable actions are also known from WO 03/021915 A2, U.S. Pat. No. 6,690,391 B1, and WO 03/043318 A1.

The complexity of operation is, however, a problem in the known multimedia equipment with personalized remote control. Many remote controls have up to 40 or more buttons, with which specific functions are selected. Different functions can even be assigned to individual buttons for each user. This has the result that most users generally use only a limited number of functions. Besides, personalization also is complicated to accomplish. With most equipment, a menu is called up using a personal "menu" button, which displays several main functions and, in part, on various highly-staggered submenus, the individual functions available. In practice, most users are overwhelmed by this complexity and usually only the younger family members are generally able to operate such equipment, which then again is counterproductive, because functions directly related to security, such as child security, home banking, or fee-required functions that can be called up, just cannot be blocked directly against young people.

SUMMARY OF THE INVENTION

It is a task of the invention, in order to improve the remote control of the type mentioned above, to make very simple operation possible, including personalization, by guaranteeing a large amount of access security.

This task is resolved by the feature presented in patent claim 1. Advantageous embodiments and developments of the invention may be drawn from the subclaims.

The multimedia arrangement according to the invention has a remote control that can be personalized, which exhibits an identification device, multimedia equipment controllable by the remote control which is, for example, a so-called set-top box and display equipment attached to this multimedia equipment which, for example, is an image screen, a so-called "beamer", a monitor, or the like. The multimedia equipment contains a microprocessor and a programmable memory connected to it, which contains a "user database" in which a large number of data are stored, the individual users are identified, their specific "rights" are assigned, and an individual configuration set for the multimedia equipment, which is then depicted on the display equipment. The user database can be both arranged in the multimedia equipment itself or entered remotely, for instance by a service provider, and be called up there over a network.

The multimedia arrangement is so designed and configured that the remote control needs only six control functions, namely four "direction functions" for "Up", "Down", "Left", and "Right", one selection function, and one "Back" function. The functions named can be called up using the buttons of a keyboard on the remote control. Instead of buttons, other input devices can also be used, such as, for instance, a so-called touch screen, which triggers the corresponding functions based on predefined finger motions or the like on the touch screen. In the same way, a voice-activated control is possible or control using sensors, which records the motions of the user's hand or the like. All the functions of the multimedia equipment can be selected using three menu levels, which are laid out abstractly and hierarchically as follows:

Menu level 1: selection of a subject group
Menu level 2: selection of a subject
Menu level 3: selection of an action with the subject selected.

This arrangement into three menu levels is kept consistent for all the functions. Always using this rigid arrangement with the three menu levels, the user can very quickly find his way around and can also always go back very easily to the first basic menu level, by calling up the "Back" function twice or by using a special function ("Home" function).

For further ease of operability, the elements of the individual menu level are arranged according to a type of matrix with vertical columns and horizontal rows, while all the remaining elements are not taken into consideration. With a matrix, each element is defined by its column and row coordinates, and as a result, it assigns both a row and a column. If only one row and only one column are represented, then one field is presented, which lies just at the intersection of column and row and which is designated in the following as a "focus field", in which one focus element is therefore found.

This focus field is located on all menu levels and is always in an unalterable, predefined location on the display equipment for all functions, and as a result it is fixed. The location so specified for the focus field can be changed, depending on the previously identified user. For example, in the Culture area, where the focus field is described and read from right to left, it is desirable to place the field in a location other than the Culture area where it is read from left to right. In the latter Culture area, the location of the focus field is preferred in the lower left corner of the display equipment. Using the four motion functions named, the elements of the columns are "moved" upward or downward so that, for instance, on the first menu level, the actual subject group is visible in the "focus" element, whereby the element of the subject group is then visible on the first menu level in the horizontal row and can be moved by performing the "Left" or "Right" motion function in the "focus" element. By operating the selection function, the subject group found in the "focus" element can then be selected and the second menu level activated, which also has the analogous arrangement or representation for elements in columns and rows. Here, upon moving the four motion functions, a subject in the "focus" element is moved, it is selected using the selection function, and the third and last menu level appears, which again has elements arranged analogously in columns and rows, in which the "focus" element then designates the action to be taken with the subject selected, which is activated by operating the selection function.

Substantial simplification and simple operation resulting therefrom is obtained by "personalization", whereby the entire system is configured for an individual user, in which a user profile is laid out. Using an identification device containing biometric data for one person, such as, for example, a finger-print reader, the individual person is first identified, whereupon a user profile established previously for the identified person is called up, which is stored in a user database. The user database contains not just access authorization, but menu systems assigned to the individual person as well, which, for instance, contain a limited number of desired television stations, that the individual user can select when setting up his user profile. As a result, for example, the number and order of tele-vision stations generally displayed on the menu system are substantially reduced, because the unwanted TV stations are not displayed at all. With this reduction in the only elements generally displayed on the individual menu system, the consistent use of the three menu systems mentioned above is clear, and the overall system is freed of superfluous encumbrances.

Aside from the simple operation of the multimedia equipment by means of a remote control, transmission security is increasingly important, because sensitive personal data are associated with access authorization, such as, for instance, name, address, birthdate, bank accounts, credit-card numbers, etc. Programmable remote controls can be obtained on the market which can read in and store data transmitted from an authentic remote control, so that it is possible to identically copy an authentic remote control and consequently log in with the copied remote control onto the multimedia equipment as an unauthorized user and to perform all the functions and as a result also to circumvent the identification device available on the remote control, such as a fingerprint reader, for instance, because the data ascertained from the identification device is sent by wireless mode to the multimedia equipment and thus can be read in by an unknown remote control. Hence, to increase access security, a replaceable hardware-related deterrent is proposed, with which the remote control is identified with respect to the multimedia equipment. Preferably, this hardware-related deterrent is a Subscriber Identity Module (SIM) card, such as is generally known with mobile telephones. Such SIM cards have proven themselves a million times over, are inexpensive to obtain, and are considered to be an extremely secure and reliable means of encryption. In addition, SIM cards also have the advantage that data can be stored on them, and as a result, pre-settings can also be transmitted to other equipment, for example if a device is defective.

A problem resulting from demands for simpler operability and access security, then, is the hardware-related expense of the remote control, which needs a very high-performance, relatively very energy-intensive, and expensive microprocessor. To resolve this resulting problem, the invention proposes that the identification device of the remote control transmit the data read in to the multimedia equipment and evaluation of these data take place first in the multimedia equipment. If the identification device is, for example, a fingerprint reader, it reads in the image data of a fingerprint, and then these unevaluated image data are transmitted to the multimedia equipment and are evaluated there first and compared with the data stored in the user database.

To increase security, these image data should certainly be encrypted, whereby preferably an asymmetric encryption method is carried out upon using the SIM card. In a particularly preferred manner, the following data are stored on the SIM card:
 a first pair of digital keys;
 a second pair of digital keys;
 a personal identification code; and
 personal data for at least one user.
In the memory of the multimedia equipment, the following data are stored after a first initialization:
 only one key of the first pair of digital keys;
 only one key of the second pair of digital keys;
 biometric data for the identification device and personal data for a user, as well as the personal identification code, encrypted with the only one key of the second pair of digital keys.

When setting up a connection between the remote control and the multimedia equipment, the SIM card reads in the biometric data for the user, adds to these the personal identification code and the other key of the second pair of digital keys, and sends a data packet so constructed, with the other, encrypted key of the first pair of digital keys to the multi-media equipment. The multimedia equipment decrypts the encrypted data record received with the stored one key of the first pair of digital keys, extracts therefrom the other key of the second pair of digital keys, the personal identification code, and the biometric data. Thereupon, it reads out from its memory the encrypted biometric data, the encrypted personal data, and the encrypted personal identification code and decrypts them with the other key of the second pair of digital keys, compares the decrypted personal identification code received and the de-crypted personal identification code stored and only activates the multimedia equipment if they agree.

Preferably, the biometric data read in was compressed before making the data record; preferably this was done according to Huffman coding. Furthermore, preferably the data record to be transmitted from the remote control to the multimedia equipment is block-encoded and is preferably provided with forward error correction.

Preferably, the multimedia equipment also has a reader for a SIM card, in which according to a variant of the invention a connection set up between the remote control and the multimedia equipment is possible only if a related pair of SIM cards is available in both sets of equipment. According to an alternative, the remote control can first store all relevant data on the SIM card found therein, whereupon the SIM card is then taken from the remote control to the multimedia equipment, in order to read in the relevant data there.

According to a further variant, the SIM card is only used for the configuration and can be removed for further operation of the remote, whereby a configuration is possible only with a SIM card available.

Furthermore, still to be mentioned is that the term "multimedia arrangement" is to be understood here in a broad sense and does not just involve entertainment and communications media but also the control of equipment and machinery in general. So various equipment can be connected to the multimedia arrangement, monitored, and/or controlled. Here, it can operate, for example, surveillance cameras, door-opening equipment, systems found in a house such as, for instance, heating systems, air-conditioning systems, lighting systems, alarm systems, and garden-watering systems, or communications systems such as telephone, fax, and Internet access, or other equipment as well, such as a kitchen stove, refrigerator, or the like. In this sense, the multimedia equipment is universal equipment, which can also perform monitoring and control functions.

BRIEF DESCRIPTION OF THE FIGURES

In the following, the invention is explained in more detail using an embodiment example in association with the drawing. Shown are:
FIG. 2 a representation of a menu level.

DETAILED DESCRIPTION OF PREFERRED EMBODIMENTS

Figure 1:
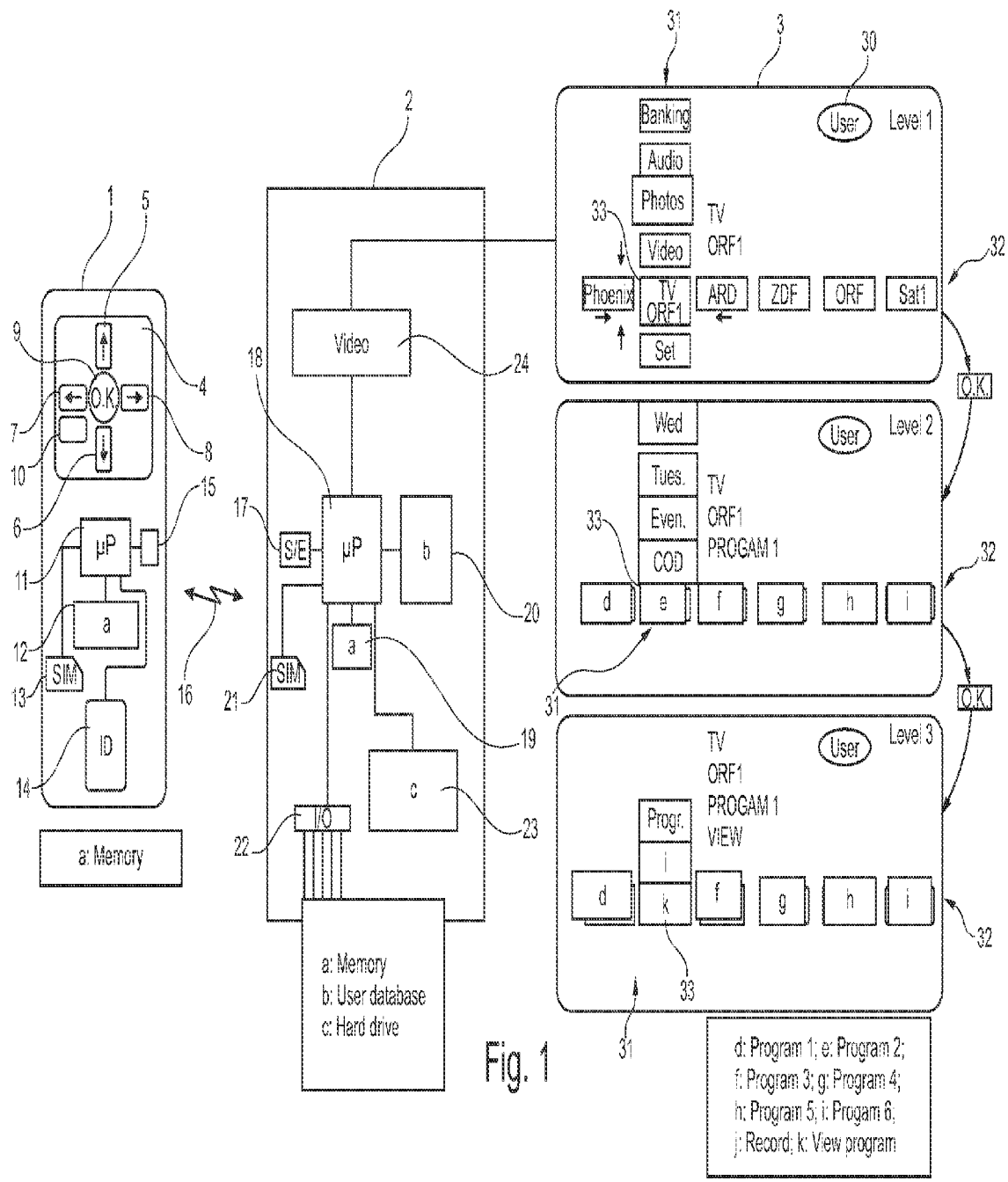
FIG. 1 a basic circuit diagram of a multimedia arrangement according to the invention.

FIG. 1 shows a remote control 1, which controls multimedia equipment 2, in which display equipment 3, such as an image screen, for instance, is connected to the multimedia equipment 2. The remote control 1 has a keyboard 4, which exhibits only six control keys, namely four movement buttons 5, 6, 7, and 8 for the directions "Up", "Down", "Left", and "Right", as well as a confirmation button 9, which triggers a selection function, and a "Back" button 10. The keyboard 4 is connected in the usual manner to a microprocessor 11, to which at least one memory 12, a SIM-card reader 13, a identification device 14, and a send/ receive unit 15 are attached. Instead of a keyboard, as mentioned above, other input devices can be used. The term "keyboard" with movement buttons hence illustrates only one possible example.

The remote control 1 can establish a wireless communications link with the multimedia equipment 2 using the send-receive unit 15, which is indicated by an arrow 16. Customarily, this is done by means of an infrared signal. The multimedia equipment 2 has a corresponding send/receive unit 17, which is connected to a microprocessor 18. Because of that, it is indicated that, between the remote control 1 and the multimedia equipment 2, both a bidirectional communications link is possible, as well as a monodirectional communications link, in which data are transmitted only from the remote control 1 to the multimedia equipment 2, but not in the opposite direction. The microprocessor 18 here has a substantially higher performance than the microprocessor 11 of the remote control 1. Moreover, connected to the microprocessor 18 is a memory 19, whereby this memory 19 either has itself an area designated as a "user database" 20 or an additional memory 20 is attached which contains the user database. The user database 20 can also be disposed externally to the multimedia equipment and, for example, can be set up by a remotely located service provider, whereby the multimedia equipment 2 can access the user database over a network. Furthermore, a SIM-card reader 21 is connected to the microprocessor, as well as one or several input/output interfaces 22, as well as further optional, peripheral equipment 23 such as a hard drive, for instance, as well as a video card 24 for processing video signals for the display equipment 3, which is, for example, a TV cathode-ray tube, an image screen, a beamer, or other equipment for depicting moving pictures, for instance.

To the interface 22 of the multimedia equipment 2, which can be a so-called set-top box, for instance, various devices can be connected, for example a telephone line, a DSL (broadband) connection, a radio link, a television receiver, a television antenna, and further peripheral equipment, such as, for instance, a video recorder, a DVD player, a CD player, a personal computer, a video camera, or other equipment found in a household, which can be controlled by the multimedia equipment 2.

For the desired personalization between a remote control 1 and multimedia equipment 2, the SIM-card reader 13 and the identification device 14 are provided on the remote control 1. Using the SIM-card reader 13, the remote control 1 is clearly identified and unauthorized remote controls are differentiated from others. A particular person is identified using the identification device 14. A preferred identification device 14 is a fingerprint reader integrated into the remote control 1, which reads in the image data of a user's fingerprint, as will be explained further below, and which is compared with data stored in the user database 20 in order to identify an authorized user.

If the remote control 1 has been identified using the SIM-card reader and the user identified with the identification device 14 with respect to the multi-media equipment 2, then the microprocessor 18 calls up from the user database 20 a user profile stored there for the respective user, using which the multimedia equipment 2 is personalized for the user logged in, in which are established, for example, access authorization, broadcast times, selected television stations, etc., which then appear on the display equipment 3. In collaboration between the microprocessor 18, the user database 20, and a program memory 19, all the possible functions are made accessible on only three menus, whereby the three menu levels are set up hierarchically as follows:

1. Selection of a subject group,
2. Selection of a subject,
3. Selection of an activity with the subject selected, in which all the functions can be controlled using only six control buttons on the keyboard 4.

In the following, this is clarified in detail using FIG. 1 as an example of a TV program. If the user has been identified, then he can be indicated on the display equipment 3 in a separate field 30 on menu level 1. A cross-shaped image of the fields appears on the display equipment 3, to be precise, the fields 31 arranged vertically in a column and fields arranged horizontally in a row 32, in which, at the intersection of the column fields 31 and the row fields 32, a so-called focus field 33 is formed which can be selected using the confirmation button 9 on the remote control 1. The basic functions in the column field 31 are selectable, such as, for instance, Basic set, TV, View videos, View photos, Play audio files, etc., in which the selection and the arrangement of the fields is already personalized for the user indicated in the field 30. All the elements of the columns 31 can be moved upward or downward using both buttons 5 and 6, so that only one element is always visible in the focus field 33.

In the embodiment example represented, the function "TV" is selected. As a result, the television station available to the user who is logged in then appears in the row fields 32. By operating buttons 7 and 8, for "Left" or "Right", the desired station can then be moved into the focus field 33 and selected by operating the selection button 9.

Then the second menu level appears, on which the programs are displayed for the TV station selected, which are visualized using the electronic program guide (EPG) that is broadcast nowadays by most stations, in which a chronological grouping is set in the column fields 31 of columns according to day of the week and/or time of day, such as morning, afternoon, or evening and the individual program is displayed in the row fields 32, including the broadcast time, if needed. The program found in the focus field 33 can then be selected with the confirmation button 9, whereupon the third menu level appears.

On the third menu level, the possible actions are displayed, such as, for instance, to View now, Record, or Program. Many different fields appear for each number of functions available.

By pressing the "Back" button 10, a current menu level reverts to the previous one.

Correspondingly, an appropriate selection appears for all the other functions. With the function "Photos at menu level 1", for example, a specific "Album" is selected, such as, for instance, Vacation, Christmas, etc. At the second level, individual photos can then be selected and at menu level 3 the appropriate action, such as View, Print, Delete, Send as e-mail, or the like.

For each authorized user, certain functions are not displayed at all. Thus, for example, the function "Home banking" is blocked for certain users and is not displayed at all for them.

On the second menu level, for instance, broadcast times or specified types of stations can be blocked and as a result are automatically suppressed, and on the third menu level, again, other functions can be released or blocked, such as, for instance, Delete recorded programs, Delete photos, or the like.

Using the personalization, the selection and arrangement of the individual elements are also coordinated for the user. So, for example, on the first menu level at the menu item "TV", the selection and arrangement of possible stations is laid out individually for a specific user, in which the station watched most often by the respective user is displayed in the focus field 33, where this also depends on the day of the week and/or the time of day. This can also be adjusted "dynamically", without the user having to actively enter the appropriate data into the user database 20. If, for example, an authorized user watches a specific station more often on one particular day of the week, this "preference" is stored in the user database 20, and on the appropriate day and hour the appropriate station and the action are placed in the focus field 33.

Using the combination of only six control buttons on the keyboard and the three menu levels, which are kept consistent for all possibilities on the equipment, the operation of the multimedia arrangement is substan-tially simplified and the hardware-related expense of the remote control is reduced by the small number of buttons. The user no longer has to remember a large number of button functions and different button positions. Using the personalization, functions not desired by him or not released to him can be suppressed at the outset, and he can easily find his way around the three menu levels. It is also emphasized that the arrangement of the fields 32 into rows and into columns 31, with a focus field 33 through which the individual fields are moved, substantially facilitates operation because the "essentials" always appear in the same place, so that the user no longer has to search on the display equipment for where the desired function is displayed in order to subsequently maneuver there with the movement buttons.

In the following, an example of the menu structure with the three levels is explained, in which fragments of the XML data used are depicted. So-called meta-definitions for the prior selection of menu elements, as well as portions of the definition for image-screen representations, are omitted for purposes of a clear overview.

On the main menu, a subject group is selected.

[menu] . . . describes an entire menu,

[item] . . . describes a menu element.

[action] . . . describes the action that will be carried out if the XML node is selected, app . . . designates the application or the program that will be loaded with the associated subject, class Name . . . designates the class to be established, menu . . . designates a new XML data file that will be loaded for the next menu level.

```
<?xml version="1.0" encoding="UTF-8"?>
<menu>
<!-- ... -->
<item id="overview" title="TV Program"
labelbgcolor="#014a8d">
<icon url="icons/mainmenu/main menu icon overview.png"
/>
<item id="show_channels" title="show all Channels">
<action className="AppEPG" app="apps/AppEPG"
menu="xml/AppEPG.xml"/>
</item>
</item>
<!-- ... -->
</menu>
```

If "show_channels" is selected, the application "apps/AppEPG" is loaded and a new instance of AppEPG is generated. The menu for the main level (subject group) is hidden, and a new menu is produced under "xml/AppEPG.xml". After the menu is generated, "AppEPG" is associated with the menu and displayed.

The selection from the first menu level is restricted at the second menu level in order to select a subject.

This XML command shows several metadata ([info]) which are used to populate the content field.

```
<?xml version="1.0" encoding="UTF-8"?>
<menu id="root_epg">
<!-- ... -->
<item id="bbc_world" title="BBC World">
<item id="bbcn" text="BBC News">
<info url="icons/tv/bbcn.png">
<time>
<start hour="08" min="00" />
<end hour="08" min="30" />
</time>
<shorttext>
<span class="headline">BBC News</span>•
<p class="subheadline">(News Magazine, UK 2007)</p>
<p class="description">Hourly news from around the world.</p>
</shorttext>
</info>
<action className="ActionTimeline"
app="apps/ActionTimeline"
menu="xml/ActionTimeline.xml" />
</item>
<!-- ... -->
</item>
<!-- ... -->
</menu>
```

At the third menu level, the subject has already been selected, so that the action to be carried out with the subject is still to be selected.

In this XML data file, the internal function "ActionTimeline" is called up, which is addressed by using its name. The three possible actions of "View", "Record this program", and "Record this series" are offered and activated using the selection button or selection function.

```
<?xml version="1.0" encoding="UTF-8"?>
<menu id="action_timeline" cache="false">
<item id="actions" title="Actions"
labelbgcolor="#461588">
<item id="action_view" title="View"/>
<item id="action_record" title="Record this Program"/>
<item id="action_record_series" title="Record this
Series"/>
</item>
</menu>
```

Figure 2:
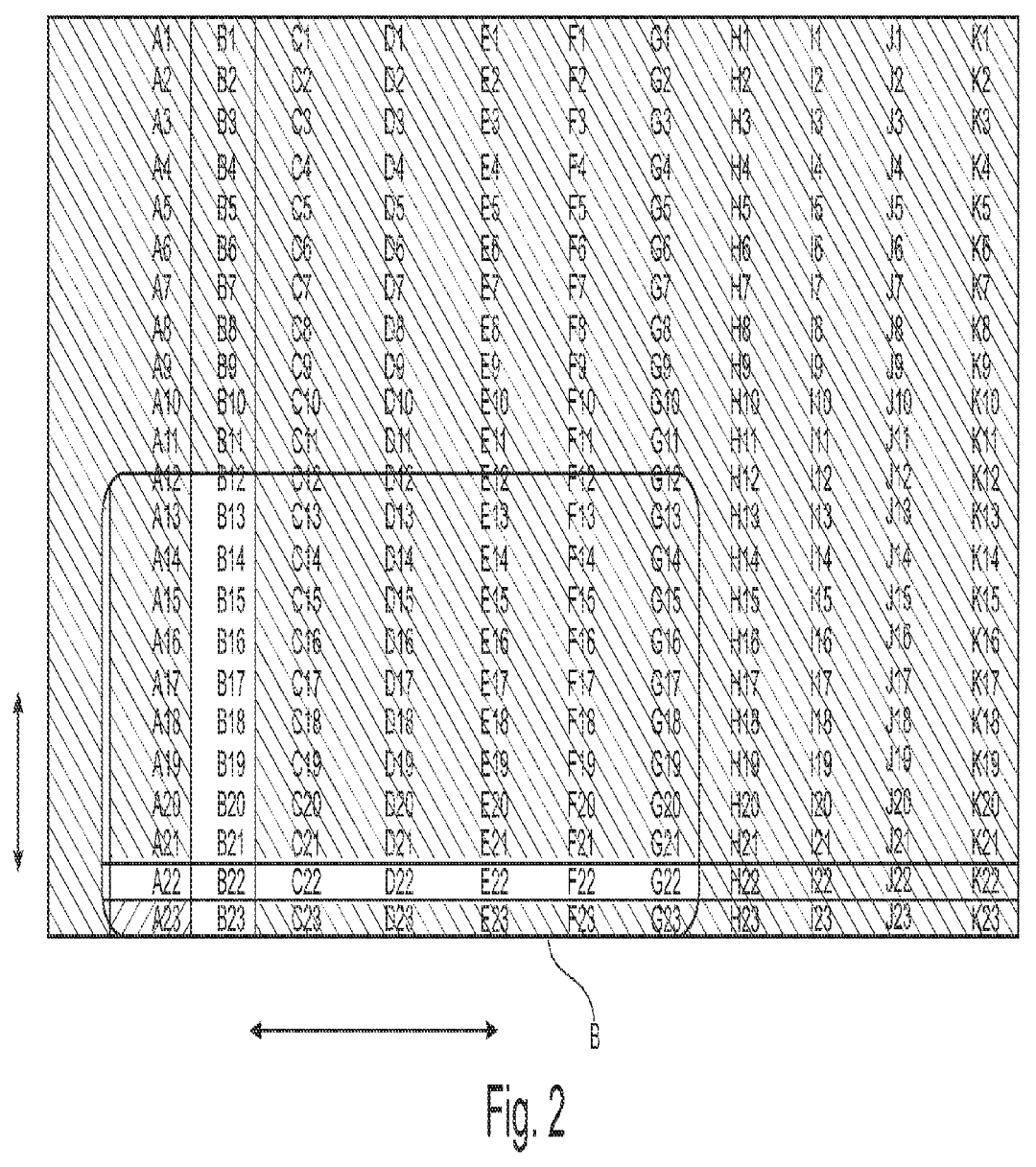

FIG. 2 shows the structure of a matrix with fields A1 through K23. An image-screen area B designates a visible area in which the entire matrix can be adjusted so that just one detail can always be depicted in the image-screen area B. In the image-screen area, only one column, here with fields B13 through B23, and one row with fields A22 through G22 are made visible, while all the other hatched fields represented are suppressed. In the junction region between the visible column and visible row is the field B22, which defines the focus field. This focus field contains, as shown above, all the necessary commands on the corresponding menu level. The whole matrix is moved using the movement functions. If, for example, the field E17 is moved to the focus field, then the function "Left" has to be called up three times and the function "Down" five times. The field B22 contains, at each menu level, either the commands to call up the next lower menu level or, at the last menu level, the step described above to execute the respective action. It is important that each field contain all the necessary information. Also, no associations have to be made between partial functions of a column and partial functions of a row.

All fields on a menu level, as represented in FIG. 2, consequently lie at the same hierarchical level (menu level) and are addressable by means of the movement functions, that is, they can be moved in the focus area.

In the suppressed area represented by the hatching in FIG. 2, further information can be inserted, such as, for instance, a title and short description of a TV program, a preview of photos, or the like.

Figure 3:
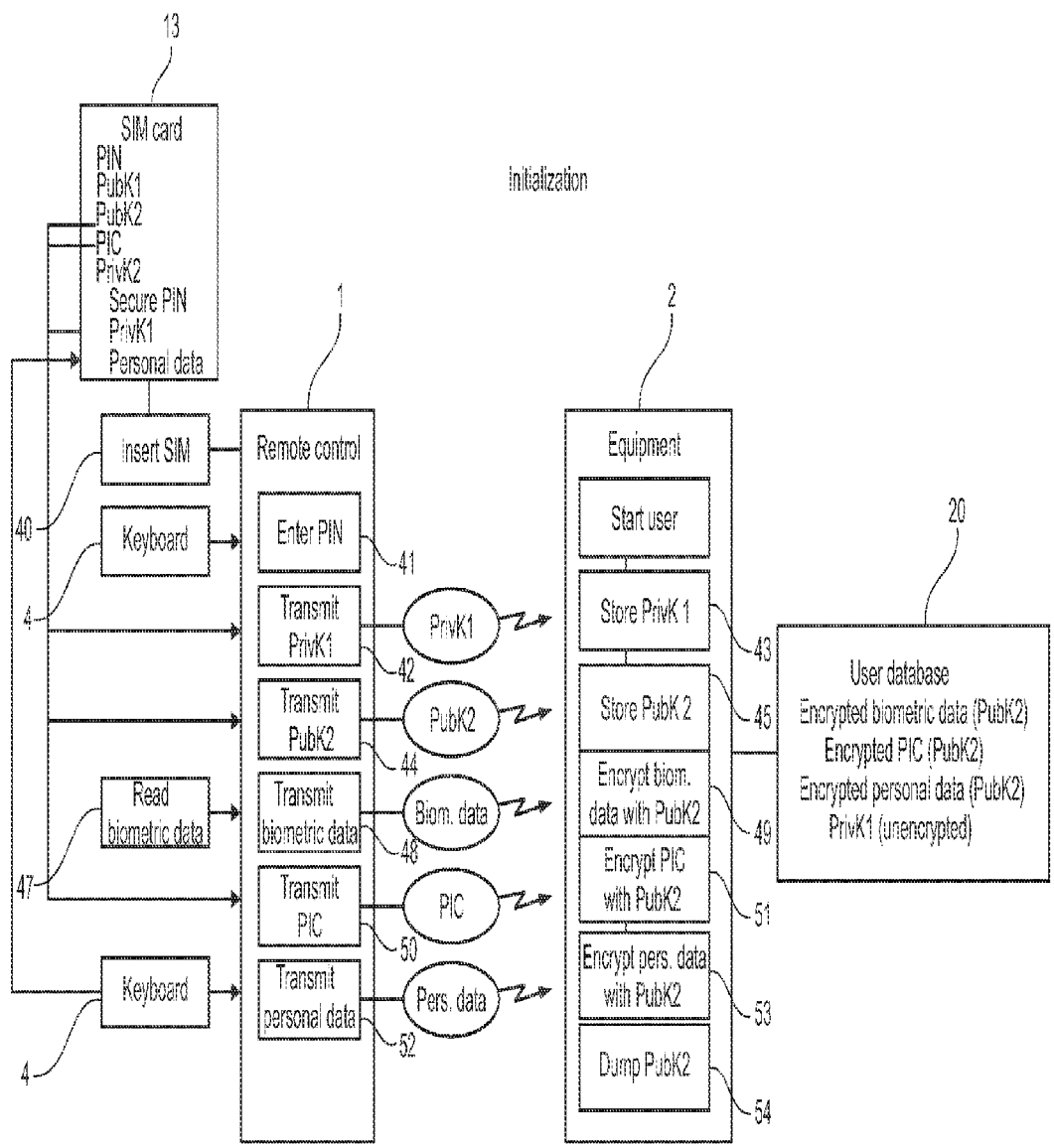
FIG. 3 a flow chart to explain the initialization of a connection between the remote control and the multimedia equipment.

With reference to FIG. 3, the initialization will now be described. First, the SIM cards are inserted into the SIM-card reader 13 of FIG. 1 at a step 40. The SIM cards contain the following stored data:
1. a personal identification number (the so-called PIN),
2. personal data for a user, such as, for instance, name, birthdate, sex, credit-card number, etc.,
3. a first private key (PrivK 1), whereby the data indicated in 2 and 3 above are accessible only after entering the PIN indicated in 1 above.

The SIM card further contains the following accessible data:
4. a second private key (PrivK 2),
5. a personal identification code (PIC),
6. a first public key (PubK 1), and
7. a second public key (PubK 2).

As is further clarified in still more detail below, the PubK 1 and PrivK 1 keys form a first, and the PubK2 and PrivK 2 form a second, pair of keys, which are used for encryption and decryption. So-called asymmetric cryptography is used for this, in which one key of one of the pairs mentioned, usually the so-called public key, is used for encryption of data, and the other key of the pair, usually the so-called private key, is used for decryption. Thus different keys are used for encryption and decryption. Decryption of data with the key used for encryption is not possible. The algorithms for encryption and decryption are known, in principle. Reference is made, for example, to the asymmetric RSA encryption algorithm, the Rabin cryptosystem, or the El-Gamal cryptosystem. After inserting the SIM cards, the PIN is then retrieved (step 41), which is entered by means of the keyboard 4 (FIG. 1) with the direction buttons in combination with the fields 31 and/or 32 of the display equipment 2 and is customarily a four-digit number. As a result, the SIM card is released, and the personal data mentioned above and the first private key PrivK 1 blocked by the PIN are accessible.

The remote control 1 then sends the first private key, PrivK 1 (step 42) and the second public key PubK 2 (step 44) using the send/receive device 15 to the multimedia equipment 2, where they are received by the send/receive device 17 and are stored in memory 19 by the microprocessor 18 (steps 42-45). Thereupon, the biometric data of the user are read in using the fingerprint reader 14 (FIG. 1) (step 47) and transmitted to the multimedia equipment 2 (step 48), where they are encrypted (step 49) with the previously received and stored public key PubK 2. Similarly, the personal identification code (PIC) is retrieved from the SIM card and transmitted to the multimedia equipment 2 (step 50), where it is also encrypted with the public key PubK 2 (step 51). Consequently, the personal data of the user are either retrieved from the SIM card or entered using the keyboard 4 and transmitted to the multimedia equipment 2 (step 52), where they are also encrypted with the second public key PubK 2 in step 53.

The second public key PubK 2, which is stored in the multimedia equipment 2 in step 45, is erased, after these processes, in step 54. A user profile, made up of the stored and partially encrypted data, is then set up and stored in the user database 20, containing the following data:
the unencrypted first private key PrivK 1, the biometric data of the user encrypted with the PubK 2 key;
the encrypted personal identification code (PIC) and the encrypted personal data, currently en-crypted with PubK 2.

Additionally, the user can add still further data to the personal data, such as, for instance, a channel listing of preferred TV channels, button positions for buttons on the remote control, blocked TV channels, TV times, and so on.

The initialization process described is classified as critical as long as the first private key PrivK 1 is transmitted by wireless mode and as a result can be "bugged", if a suitable receiver is within range. With infrared transmission, the danger of a suitable receiver being in range, though, is very small, because the range is severely limited and an uninterrupted line-of-sight connection is required.

High security is, however, provided afterward because the remaining data are encrypted with the public key PubK 2, which is erased in the multimedia equipment 2 after initialization, and these data cannot be decrypted with the first private key PrivK 1.

To further increase security, the private key PrivK 1 can also be erased on the SIM card, so that it can be called a "more private" key, which is still only available to the equipment.

Figure 4:
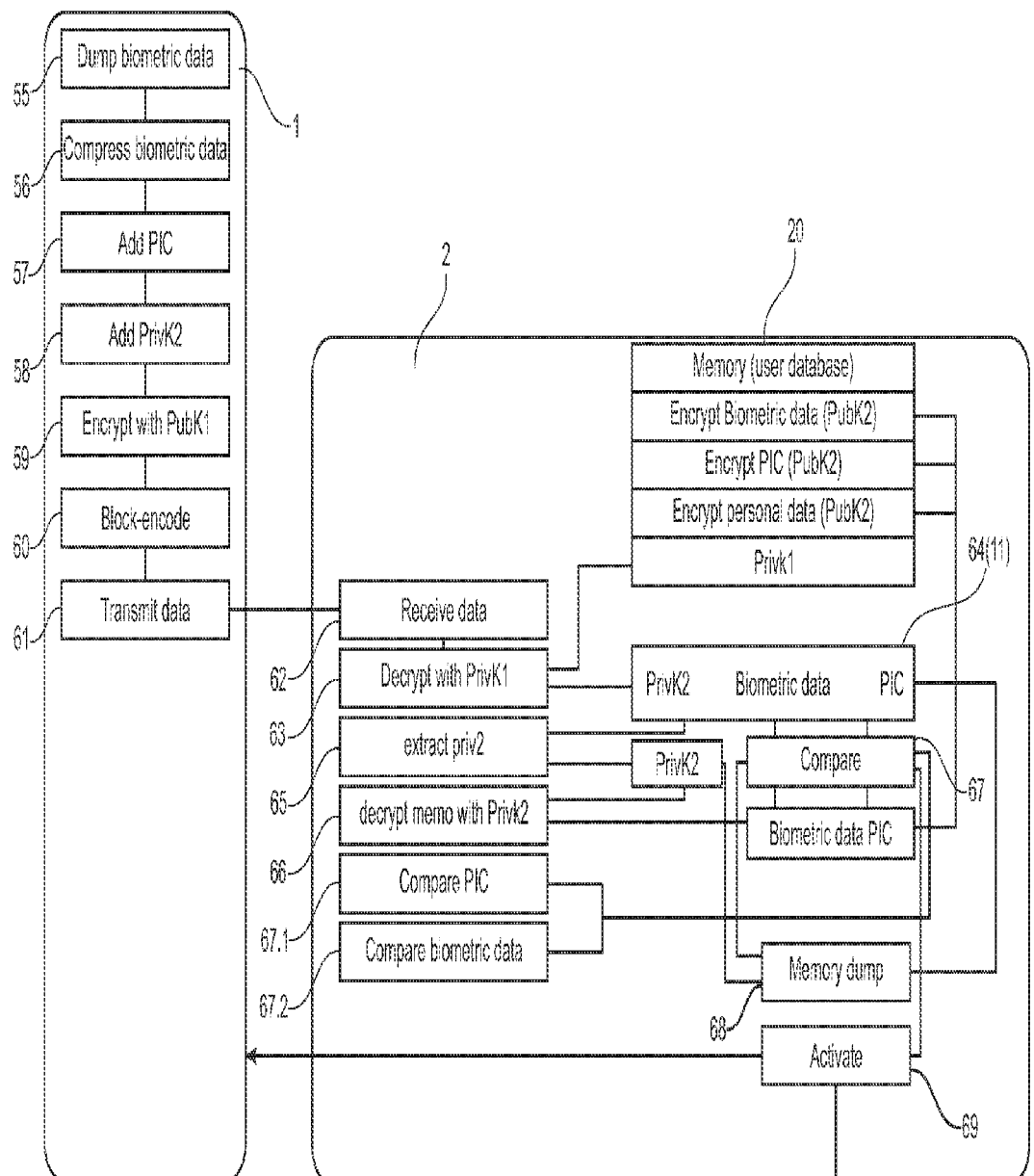
FIG. 4 a flow chart to clarify an identification process between remote control and multimedia equipment.

In connection with FIG. 4, the normal identification process will now be described, whereby a link is established between the remote control 1 and the initialized multimedia equipment 2. It is conse-quently assumed that the remote control 1 is send-ready and the multimedia equipment 2 is receive-ready.

The biometric data of the user are read in a step 55, for example, as the user lays a finger on the finger-print reader 14, which reads in the corresponding image data. These image data can be compressed in a step 56, which is done according to known data-compression methods, such as, for instance, Huffman coding.

These compressed image data are added in a step 57 to the personal identification code PIC, which is read out either from the SIM card or from the memory 12 (FIG. 11). Furthermore, the second private key PrivK 2 is added in step 58, which is also read out either from the SIM card or from the memory 12. This entire data packet consists of the compressed biometric data, the PIC, and the key PrivK 2. This data packet is encrypted with the first public key PubK 1 in a step 59. In addition, block encoding and so-called "forward error correction (FEC) can be optionally performed (step 60).

Thereupon, the data so produced are transmitted to the multimedia equipment 2 over the radio link 16 (step 61) and received by the multimedia equipment 2 (step 62). There, these data are first decrypted (step 63) with the private key PrivK 1 stored in the user database 20, whereupon a data record is obtained (block 64) with the PrivK 2, PIC, and biometric data, from which the second private key PrivK 2 is extracted in step 65. The biometric data and the PIC are temporarily stored in a cache memory 19. With the now decrypted and extracted second private key PrivK 2, the data stored in the user database in step 66 and encrypted with the public key PubK 2 before storage, namely the PIC, the biometric data, and the personal data, are decrypted, and in the resulting step 67, the now decrypted data from the user database and the data received are compared. Appropriately, the PIC's are compared first. If these do not agree, the data received from an authorized remote control are not authorized, so that further operational steps can be called off. If necessary, a request is created for repeat transmissions, which, for example, is displayed on an image screen of the TV equipment or transmitted as a return signal to the remote control 1 over the radio link 16 and is displayed there.

If a comparison of the PIC yields an authorized remote control, then the biometric data are compared (step 67.1) and if they agree, the microprocessor 18 emits a release signal in its output to the interface 22 (step 69). Then secure, authorized operation of the multimedia equipment 2 and of the further equipment attached to it can be carried out using the remote control 1. A receipt signal for a successful log-on is also transmitted over the radio link 16 of the remote control 1, which erases sensitive data in the memory 12 in the remote control 1, in particular the biometric data recorded. Similarly, the data to be compared are also erased in the memory 19 of the equipment 2, so that the memories 12 and 19 of the remote control 1 and of the equipment 2 are again in their initial state after successful log-on. Then normal operation is established between remote control 1 and multimedia equipment 2, which can also be bidirectional.

For reasons of security, it can also be provided that the authorized connection be cut off after a predetermined length of time and a new log-on be performed, according to the steps described in connection with FIG. 3. It can also be provided that for specific, security-relevant control processes, a new identification be made, for example, by transmitting name, address, or credit-card number over the communications equipment connected.

With the initialization according to the operational steps described above in connection with FIG. 3, user rights can also be granted with the personal data of the particular user, for example, related to setting up or changing user profiles, so that, for instance, only specified persons who are identified by their biometric data are authorized to set up new users in the user database or to change the rights assigned to particular individual users. Other data which are also stored in the personal data, can, on the other hand, be so arranged that the individual user can freely change them, after his identification, such as, for example, the button position on the remote control or favorite lists of individual TV stations, insofar as these are decontrolled.

In summary, a very high level of security is attained with the invention. If the equipment itself gets into the hands of unauthorized persons without a SIM card, it is not possible to get hold of the protected biometric data and the protected personal data. Only if an unauthorized person has the equipment and the SIM card at his disposal is it then theoretically possible to decrypt the protected data stored in the user database 20 with the first key PubK 1 stored on the SIM card. For this, the user must then have immediate access to the user database 20, which requires a highly technical effort. Here the manufacturer can provide that the corresponding memory be protected such that either no access is possible from outside or its content is automatically erased if an attempt is made to remove it from the memory. In any case, it is recommended to purge the memory containing the user database before handing the equipment over to third parties.

The invention claimed is:
1. A multimedia arrangement comprising:
a remote control comprising an input device, a first microprocessor, at least one first memory, an identification device which contains biometric data for a person, and a first communications transceiver for data transmission;

multimedia equipment comprising a second microprocessor, a second communications transceiver for receiving data from the first communications transceiver, at least one interface, and at least one user database for storing a user profile; and display equipment, which is connected to the multimedia equipment;

wherein the input device of the remote control is designed to call up control functions, whose functions of:
"UP",
"DOWN",
"LEFT",
"RIGHT",
"SELECT", and
"BACK" are assigned;

wherein all of the functions of the multimedia equipment can be controlled on only three menu levels consisting of:

a first menu level for selecting a subject group,
a second menu level for selecting a subject, and
a third menu level for selecting an action to be performed with the subject;

wherein each of the menu levels comprises a matrix depicted on the display equipment and the matrix of each of the only three menu levels comprises a single vertical column comprising column fields and a single horizontal row comprising row fields;

wherein the column fields of each of the only three menu levels display elements within a single hierarchy and the row fields of each of the only three menu levels display elements within a single hierarchy different from the hierarchy of the column fields;

wherein an intersection between the vertical column and horizontal row of each of the only three menu levels defines a focus field;

wherein, for each of the only three menu levels, either
A) the elements depicted in the row fields are within the scope of a selection from the column fields displayed in the focus field and the row field elements change depending on which column field is displayed in the focus field; or
B) the elements depicted in the column fields are within the scope of a selection from the row fields displayed in the focus field and the column field elements change depending on which row field is displayed in the focus field;

wherein the second microprocessor delivers, upon receiving control signals from the remote control, depending on the identification device and actuation of the input device, the received control signals to the display equipment, that a single element of the matrix is placed in the focus field that is arranged at the intersection of the single vertical column formed and of the single horizontal row formed;

wherein selection and arrangement of individual elements are subject to personalization;

wherein an element found in the focus field can be activated by a selection function of the input device;

wherein the elements displayed in the column fields and the row fields are configured, depending on the received control signals from the identification device, together with the user profile stored in the at least one user database;

whereby the user navigates between one of the three menu levels and the user has the option of returning to the first menu level via the other menu levels or via a home function; and wherein the remote control comprises a SIM (Subscriber Identification Module) card reader into which a SIM card can be inserted and wherein the remote control and the multimedia equipment only activate a communications connection between the first and the second communications transceivers if a pre-specified SIM card is inserted into the SIM-card reader of the remote control.

2. The multimedia arrangement according to claim 1, wherein the microprocessor of the multimedia equipment is configured such that received control signals from the input device are only processed if the identification device of the remote control has transmitted to the multimedia equipment predetermined received control signals which correspond to received control signals in the user database.

3. The multimedia arrangement according to claim 1, wherein the multimedia equipment comprises a SIM-card reader and the microprocessor of the multimedia equipment is so configured that activation of the communications connection only results when a SIM card is inserted into the SIM-card reader of the multimedia equipment.

4. The multimedia arrangement according to claim 1:
wherein the following data are stored on the SIM card of the SIM-card reader of the remote control:
a first pair of digital keys,
a second pair of digital keys,
a personal identification code (PIC), and
personal data for at least one user;
wherein the at least one first memory of the multimedia equipment holds the following data, based on a first initialization:
only one key of the first pair of digital keys,
only one key of the second pair of digital keys,
with only one key of which in the second pair of digital keys are encrypted biometric data and personal data, as well as the personal identification code;
wherein, upon setting up a connection between the remote control and the multimedia equipment, the identification device feeds in biometric data for the user and adds these to the personal identification code (PIC) and to the other key of the second pair of digital keys, reads out from the at least one first memory unit the encrypted biometric data, the encrypted personal data, and the encrypted personal identification code (PIC) and decrypts them using the other key of the second pair of digital keys, compares the decrypted personal identification code received with the decrypted personal identification code stored and if they agree, compares the decrypted biometric data received with the decrypted biometric data stored and only activates the multimedia equipment if they agree.

5. The multimedia arrangement according to claim 4, wherein biometric data determined are compressed by the identification device of the remote control before transmission to the multimedia equipment.

6. The multimedia arrangement according to claim 5, wherein the compression is performed in accordance with Huffman coding.

7. The multimedia arrangement according to claim 4, wherein a data record to be transmitted is block-encoded from the remote control to the multimedia equipment.

8. The multimedia arrangement according to claim 4, wherein a data record to be transmitted is provided by the remote control to the multimedia equipment with forward error correction.

9. The multimedia arrangement according to claim 4, wherein the multimedia equipment comprises a SIM-card reader, and the microprocessor of the multimedia equipment is so configured that activation of the communications connection only results when a SIM card is inserted into the SIM-card reader of the multimedia equipment.

10. The multimedia arrangement of claim 1 wherein:
television and photographs are among selections in the vertical column of the matrix of the first menu level and available television stations are selections in the horizontal row of the first menu level;
chronological selections are in the vertical column of the matrix of the second menu level and individual television programs are selections in the horizontal row of the matrix of the second menu level; and
current viewing and recording are selections in the matrix of the third menu level.

11. The multimedia arrangement of claim 1 wherein the horizontal row of the first menu level consists of a selection of television stations.

12. The multimedia arrangement of claim 1 wherein the horizontal row of the second menu level consists of individual television programs.

13. The multimedia arrangement of claim 12 wherein the horizontal row of the third menu level consists of action to be performed on a television program selected from the second menu level.

14. The multimedia arrangement of claim 1 wherein the horizontal row of the third menu level consists of action to be performed on a subject selected from the second menu level.

15. The multimedia arrangement of claim 1 wherein:
the horizontal row of the first menu level consists of a selection of television stations;
the horizontal row of the second menu level consists of individual television programs;
the horizontal row of the third menu level consists of action to be performed on a television program selected from the second menu level.

16. The multimedia arrangement of claim 1 wherein subject groups available for selection at the first menu level include both photographs and television.

17. The multimedia arrangement of claim 1 wherein selection of an item in the focus field at the first menu level causes the first menu level and its row and column fields to be replaced on the display by the second menu and its row and column fields, and selection of an item in the focus field at the second menu level causes the second menu level and its row and column fields to be replaced on the display by the third menu level and its row and column fields.

* * * * *